Nov. 21, 1933.  W. C. HEDGCOCK  1,936,392
BRAKE SUPPORTING MECHANISM
Filed Dec. 15, 1928  2 Sheets-Sheet 1
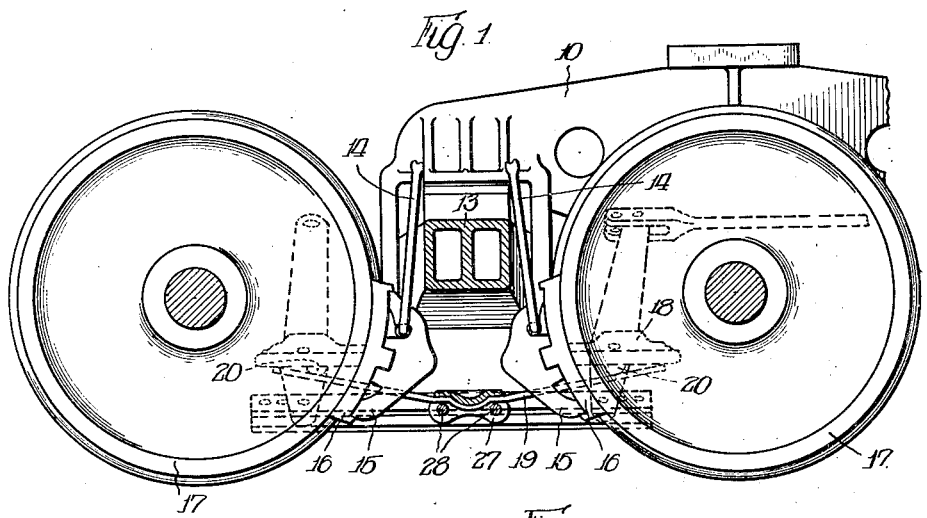
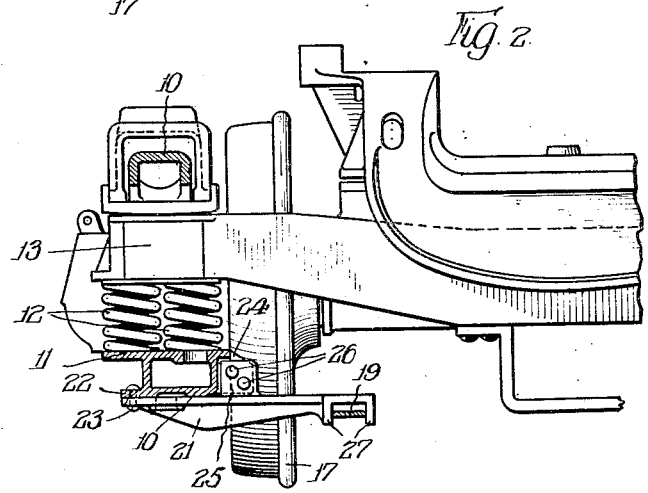
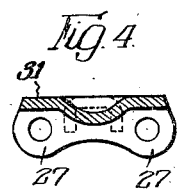
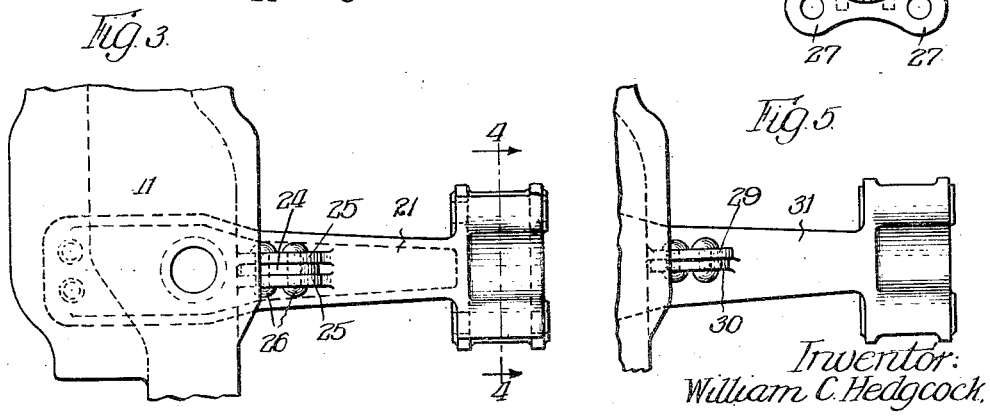
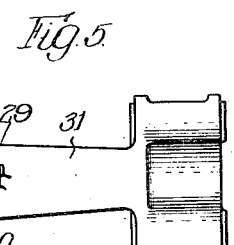
Inventor:
William C. Hedgcock.
By Wilkinson, Huxley, Byron & Knight
attys.

Nov. 21, 1933.  W. C. HEDGCOCK  1,936,392
BRAKE SUPPORTING MECHANISM
Filed Dec. 15, 1928  2 Sheets-Sheet 2
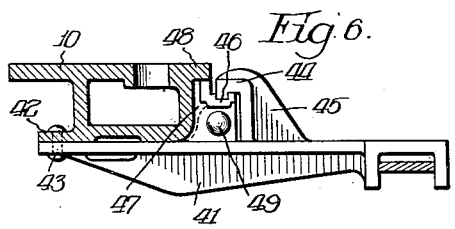
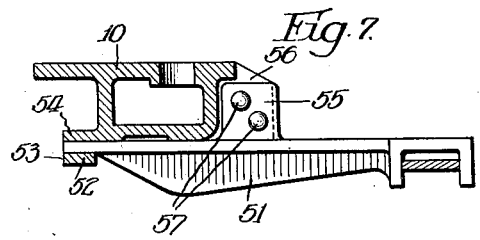
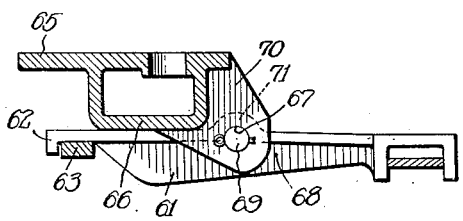
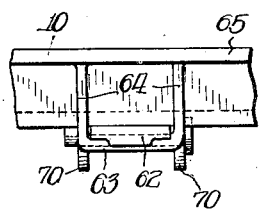
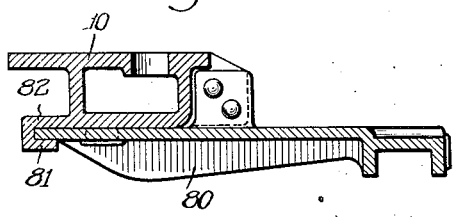
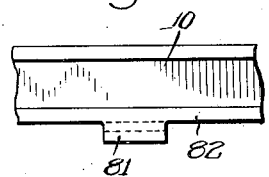
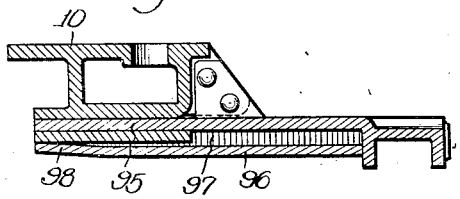
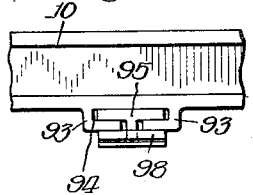
Inventor:
William C. Hedgcock,
By Wilkinson, Huxley, Byron & King
Attys Patented Nov. 21, 1933

1,936,392

UNITED STATES PATENT OFFICE 1,936,392

BRAKE SUPPORTING MECHANISM

William C. Hedgcock, Chicago, Ill., assignor to American Steel Foundries, Chicago, Ill., a corporation of New Jersey Application December 15, 1928
Serial No. 326,242

22 Claims. (Cl. 188—210)

This invention relates to brake supporting mechanism, and more particularly to means for supporting and leveling brake beams carried by railway car trucks.

One object of the invention is to provide simple, durable, reliable and inexpensive means for supporting brake beam safety and leveling members.

Another object is to provide a cooperative association between the side frames and brake beam safety and leveling means, which association is simple, economical and efficient.

Another object is to provide a car truck in which the various elements cooperate in a new and improved manner and in a manner to meet all of the requirements under service conditions.

These and other objects are accomplished by means of the arrangements disclosed on the accompanying sheets of drawings, in which—

Figure 1 is a fragmentary side elevation of a railway car truck embodying the invention;

Figure 2 is a transverse sectional view of the same;

Figure 3 is a fragmentary top plan view of a side frame and means connected thereto for supporting a brake beam safety and leveling member;

Figure 4 is a detail sectional view taken in the plane of line 4—4 of Figure 3;

Figure 5 is a detail plan view similar to that shown in Figure 3 and embodying a modification of the invention;

Figures 6, 7 and 8 are fragmentary detail transverse sectional views of modified forms of connection between the side frame and brackets for carrying the brake beam safety and leveling means;

Figure 9 is a fragmentary side elevation of the arrangement shown in Figure 8;

Figure 10 is a fragmentary detail transverse sectional view of another modified form of connection between the side frame and bracket for supporting the brake leveling means;

Figure 11 is a fragmentary side elevation of the arrangement shown in Figure 10;

Figure 12 is a detail sectional view of another form of connection between the side frame and bracket; and Figure 13 is a fragmentary side elevation of the arrangement shown in Figure 12.

The various novel features of the invention will be apparent from the following description and drawings and will be particularly pointed out in the appended claims.

Referring to the figures of the drawings, it will be noted that the invention is illustrated in connection with a railway car truck having oppositely arranged side frames 10, each of which is provided with the usual bolster opening, the floor 11 of which forms a seat for springs 12 upon which the associated end of the bolster 13 is mounted. The floor 11 is provided on the upper portion of the tension member of the side frames, this tension member comprising a beam portion extending between the column guides and defining the bolster opening at the bottom. Suitably supported hanger brackets 14 are provided, to the lower ends of which brake heads 15 are pivotally connected, said brake heads carrying brake shoes 16 which are adapted to be applied to the treads of truck wheels 17 for braking purposes. The brake heads are operatively connected to opposite ends of brake beams 18, under which are located brake beam safety and leveling bars 19, the outer ends of which are tilted slightly upwardly and are slidably engaged by shoes 20 carried by suitable portions of the brake beams. As a result thereof, not only do the members 19 serve to prevent the brake beams from falling to the ground in the event that they are torn from their normal hangings, but also serve to guide the brake beams in a manner whereby the braking surfaces of the brake shoes at all times are parallel with the treads of the associated truck wheels.

This invention relates particularly to means for carrying or supporting the brake beam safety and leveling members 19. Referring first to Figures 1, 2 and 3, it will be seen that such means takes the form of arms 21, one extending laterally inwardly from each of the side frames 10. Each arm 21 at its outer end is secured to an outwardly extending lower flange 22 of the side frame at the middle portion lengthwise thereof by vertically extending rivets 23. If only these vertically extending rivets were provided for securing together the parts in question, it will be appreciated that said rivets, due to the tension stresses placed thereon and the vibration set up, would soon become loose under service conditions and become inefficient, if not dangerous. Accordingly, we have provided additional means for securing said supporting arms 21 to the side frames. In this connection, each arm 21 intermediate its length and extending upwardly from its upper surface has a pair of projections or tongues 25 which extend to embrace a projection 24 formed on the inner side of the side frame 10. Rivets 26 are passed through apertures in said projections 24 and 25 to securely connect the arm and the side frame.

It will be noted that the rivets 26 are arranged in a manner whereby they are subjected to shearing stresses as distinguished from tensile stresses, thereby providing an arrangement in which the arm 21 cannot become loosened with respect to the side frame 10 regardless of service conditions.

The inner end of each of the arms 21 is provided with downwardly and laterally extending apertured ears 27 for the reception of pins 28 which hold the brake beam safety and leveling members 19 in operative position between said ears. In this way, the brake beam safety and leveling members 19 are properly supported for performing their functions. The supporting means for said members 19 are simple, inexpensive and durable and meet service requirements.

In Figure 5 there is shown a modification in which the side frame is provided with a single projection 29 which extends laterally inwardly forming an attaching means for the adjacently arranged projection 30 formed on the arm 31; otherwise the arrangement shown in Figure 5 is the same as that shown in Figures 1, 2 and 3.

Figure 6 illustrates a further modification in which it will be seen that a supporting arm 41 extends laterally inwardly from the side frame 10. The arm 41 at its outer end is secured to an outwardly extending lower flange 42 of the side frame at the middle portion lengthwise thereof by a vertically extending rivet 43. Each arm 41 intermediate its length and extending upwardly from its upper surface has two hooks 44, one on each side of an upwardly extending projection or flange 45 also formed on said arm. The hooks 44 at their upper ends turn outwardly and downwardly to interlock with corresponding hooks 46 formed integrally with the side frame on opposite sides of a projection or flange 47 also formed integrally with the side frame. The hooks 46 extend downwardly from the upper surface of the inner flange 48 of the side frame, then laterally inwardly and then turn upwardly. Not only do said hooks 44 and 46 support and interlock the arm with the side frame to prevent downward movement of the arm but said hooks also interengage with the projections and flanges 47 and 45 respectively of the side frame and arms to prevent relative movement therebetween longitudinally of the side frame. To make the connection more secure, a horizontally arranged rivet 49 is passed through and secured to said projections 45 and 47.

Referring to Figure 7, in which another modification is shown, each arm 51 at its outer end is supported by a shelf or bracket portion 52 of a closed loop 53 formed integrally with and extending downwardly from the lower flange 54 of the side frame 10. The outer end of the arm is not secured to the side frame but is merely slipped into the closed loop 53 to permit said end of the arm to rest upon and be supported by the shelf 52. In order to prevent the arm from moving out of supporting position and to reinforce the supporting connection referred to, the middle portion of the arm 51 has extending upwardly therefrom a projection or flange 55 which is arranged adjacent to a projection or flange 56 extending laterally inwardly from the side frame 10, said projections or flanges 55 and 56 being connected to each other by the rivets 57. Said rivets are in shear, thereby making a strong connection between the arm and the side frame.

In Figures 8 and 9, the arm 61 at its outer end is provided with a hook portion 62 which passes outwardly beyond a support 63 formed integrally with downwardly extending flanges 64 projecting outwardly from the outer side of the side frame 10 below the upper outer flange 65 thereof. After extending over and beyond said support 63, the outer hook portion of the arm 61 extends downwardly to hook over said support 63. Just inwardly from the outer hook portion 62 of the arm 61, the flange on the arm 61 engages the lower box element 66 of the side frame 10, and just inwardly beyond said box element 66, the arm 61 is provided with an aperture 67 in its web 68, through which a rivet or pin 69 extends. This rivet or pin 69 also extends through adjacently arranged downwardly and inwardly extending projections or flanges 70 formed integrally with the side frame. The arm 61 extends between said flanges or projections 70, and the flange of said arm 61 is provided with an arcuate portion 71 which conforms to the shape of the pin or rivet 69 for cooperating to position the arm 61 with respect to the side frame. The pin connection cooperates with the hook connection for securing the arm 61 in operative position.

Referring to Figures 10 and 11, there is shown another modification in which the outer end of the arm 80 is seated upon a shelf or hook portion 81 which is formed by a reentrant flange spaced below the outer lower flange 82 of the side frame 10. In effect, the outer end portion of the shelf is closed, otherwise the arrangement shown in Figures 10 and 11 is substantially the same as that disclosed in Figure 7.

An additional modification is shown in Figures 12 and 13, in which the side frame is provided with two depending L-shaped portions 93 which together form a groove 94 arranged transversely at the under side of the frame for the reception of the upper flange 95 of the I-shaped outer end section of the arm 96. The web 97 of the arm 96 extends through the space provided between the L-shaped portions 93, and the lower flange 98 is located below the L-shaped portions 93. In this way the outer end of the arm 96 is supported by the side frame through what might be called a tongue and groove connection; otherwise the arrangement is the same as shown in Figure 7.

By means of the arrangements herein disclosed the objects of the invention are accomplished.

It is my intention to cover all modifications of the invention falling within the spirit and scope of the appended claims.

I claim:

1. In a railway car truck, the combination of a side frame, and an arm extending inwardly therefrom for carrying a brake beam engaging element below the brake beam, said side frame and arm being connected by a member under shearing stresses to prevent detachment or loosening of said parts.

2. In a railway car truck, the combination of a side frame, and an arm extending laterally therefrom for carrying a brake beam engaging element below the brake beam, said frame and arm having overlapping parts connected by an element under shearing stresses to prevent detachment or loosening of said parts.

3. In a railway car truck, the combination of a side frame, and an arm extending laterally therefrom for carrying a brake beam engaging element below the brake beam, the outer end of said arm having one connection with said side frame, said arm having an intermediate projection by means of which said arm is additionally secured to said side frame.

4. In a railway car truck, the combination of a side frame having a projection, an arm extending laterally therefrom for carrying a brake beam engaging element below the brake beam, said arm at its outer end being secured to said side frame, said arm at an intermediate point having an upwardly extending projection arranged adjacent to said frame projection, and means connecting said projections for forming an additional connection between said side frame and arm.

5. In a railway car truck, the combination of a side frame having a spring seat, an arm extending laterally therefrom for carrying a brake beam engaging element below the brake beam, said side frame and said arm having adjacently arranged substantially vertically disposed projections laterally of said spring seat to provide an unobstructed seat, and means for connecting said projections for securing said arm to said side frame.

6. In a railway car truck, the combination of a side frame having a shelf portion, an arm extending laterally from said frame for carrying a brake beam engaging element below the brake beam, said arm having a portion resting upon said shelf for supporting said arm, and means for securing said arm in supported position with respect to said side frame.

7. In a railway car truck, the combination of a side frame having a spring seat and pocket portion spaced therefrom, an arm extending laterally from said frame for carrying a brake beam engaging element below the brake beam, said arm having a portion resting in said pocket for supporting said arm, said arm and frame having adjacently arranged projections laterally of said spring seat and connected to each other for securing said arm in supported position with respect to said side frame to provide an unobstructed spring seat.

8. In a railway car truck, the combination of a side frame having a pocket portion, an arm extending laterally from said frame for carrying a brake beam engaging element below the brake beam, said arm having a portion resting in said pocket for supporting said arm, said arm having an upwardly extending projection and said side frame having a laterally extending projection which are connected to each other for securing said arm in supported position with respect to said side frame.

9. In a railway car truck, the combination of a side frame, an arm extending laterally therefrom and having a seat at one end for carrying a brake beam engaging element below the brake beam, said arm having its other end hooked over a portion of said side frame for supporting said arm, and means intermediate the ends of said arm for securing said arm to said side frame in said supporting position.

10. In a railway car truck, the combination of a side frame, an arm extending laterally therefrom for carrying a brake beam engaging element below the brake beam, said arm having one end thereof hooked over a portion of said side frame for supporting said arm, spaced flanges formed on said side frame, and means extending through said flanges and said arm for securing said arm to said side frame in said supporting position.

11. In a railway car truck, the combination of a side frame, an arm extending under the main portion of said side frame and laterally therefrom for carrying a brake beam engaging element below the brake beam, said arm having one end thereof hooked over a portion of said side frame for supporting said arm, and a member subjected to shearing stresses connecting said side frame and arm for securing the latter to said side frame in said supporting position.

12. In a railway car truck, the combination of a side frame having a supporting member at its lower outer side and two projections extending inwardly from its inner side, an arm extending under said side frame and laterally therefrom for carrying a brake beam engaging element below the brake beam, said arm having one end thereof hooked over said side frame supporting member whereby the arm is supported and having an intermediate portion extending between said projections, and means extending through said arm and through said projections for securing said arm in said supporting position.

13. In a railway car truck, the combination of a side frame, and an arm extending laterally therefrom for carrying a brake beam engaging element below the brake beam, said arm at one end being hooked to said side frame whereby said arm is supported, said side frame and arm also having cooperating projections, and means under shearing stresses for securing said projections to each other to make more secure said hook connections.

14. In a railway car truck, the combination of a side frame having a spring seat, and an arm extending laterally therefrom for carrying a brake beam engaging element below the brake beam, said arm and said side frame each having hook portions laterally of said spring seat for interlocking with each other whereby said arm is supported.

15. In a railway car truck, the combination of a side frame having a spring seat, and an arm extending laterally therefrom for carrying a brake beam engaging element below the brake beam, said arm and said side frame each having hook portions laterally of said spring seat for interlocking with each other whereby said arm is supported, said side frame and arm also having projections connected to each other to reinforce said hook connections.

16. In a railway car truck, the combination of a side frame, and an arm extending laterally therefrom for carrying a brake beam engaging element below the brake beam, said arm having an upwardly extending hook and said side frame having a downwardly extending hook which interengage to support said arm.

17. In a railway car truck, the combination of a side frame, and an arm extending laterally therefrom for carrying a brake beam engaging element below the brake beam, said arm having an upwardly extending hook and said side frame having a downwardly extending hook which interengage to support said arm, said arm having an upwardly extending projection and said side frame a laterally extending projection which are connected to reinforce said hook connection.

18. In a truck, the combination of a side frame having a beam portion, said beam portion being provided with a hook member and a bracket member, and a member adapted to support brake means engaging said hook member and being secured to said bracket member.

19. In a truck, the combination of a side frame having a beam portion, said beam portion being provided with a reentrant portion and a bracket member, and a member adapted to support brake means having an end engaging in said reentrant portion and being secured to said bracket member.

20. A support for brake engaging means including an arm, a seat for said brake engaging means, and a securing hook, said arm having a securing bracket thereon.

21. A support for brake engaging means including an arm, a seat for said brake engaging means, and a securing hook, said arm having a securing bracket thereon adjacent said hook.

22. A support for brake engaging means including an arm provided with a positioning hook, a seat for said brake engaging means, a securing bracket, and an apertured securing portion provided on said arm.

WILLIAM C. HEDGCOCK.